United States Patent
Wang et al.

(10) Patent No.: US 6,444,335 B1
(45) Date of Patent: Sep. 3, 2002

(54) THERMAL/ENVIRONMENTAL BARRIER COATING FOR SILICON-CONTAINING MATERIALS

(75) Inventors: Hongyu Wang, Niskayuna, NY (US); Irene T. Spitsberg, Loveland; Bangalore A. Nagaraj, West Chester, both of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/543,956

(22) Filed: Apr. 6, 2000

(51) Int. Cl.[7] .................... B32B 9/00; F03B 3/12
(52) U.S. Cl. ............... 428/701; 428/446; 428/697; 428/698; 428/699; 428/702; 416/241 B
(58) Field of Search ................ 428/689, 698, 428/697, 699, 701, 702, 469, 472, 408, 432, 457, 446; 416/241 R, 241 B

(56) References Cited

U.S. PATENT DOCUMENTS

| | | |
|---|---|---|
| 5,164,266 A | 11/1992 | Kita |
| 5,897,916 A | 4/1999 | Kobayashi et al. |
| 5,985,470 A | 11/1999 | Spitsberg et al. |
| 6,296,941 B1 | 10/2001 | Eaton et al. |
| 6,296,942 B1 * | 10/2001 | Eaton, Jr. et al. |
| 6,299,988 B1 | 10/2001 | Wang et al. |

FOREIGN PATENT DOCUMENTS

EP 5238859 9/1993

OTHER PUBLICATIONS

U.S. patent application Ser. No. 09/299,419, Wang et al., filed Apr. 26, 1999.

* cited by examiner

*Primary Examiner*—Deborah Jones
*Assistant Examiner*—Jennifer McNeil
(74) *Attorney, Agent, or Firm*—David L. Narciso; Gary M. Hartman; Domenica N. S. Hartman

(57) ABSTRACT

A coating system for Si-containing material, such as those used to form articles exposed to high temperatures, including the hostile thermal environment of a gas turbine engine. The coating system is a compositionally-graded thermal/environmental barrier coating (T/EBC) system that exhibits improved mechanical integrity for high application temperatures that necessitate thick protective coatings. The T/EBC system includes an intermediate layer containing YSZ and BSAS, mullite and/or alumina, which is preferably used in combination with a mullite-containing layer that overlies the surface of the Si-containing material, a layer of BSAS between the mullite-containing layer and the intermediate layer, and a thermal-insulating top coat of YSZ overlying the intermediate layer.

32 Claims, 1 Drawing Sheet

THERMAL/ENVIRONMENTAL BARRIER COATING FOR SILICON-CONTAINING MATERIALS

FIELD OF THE INVENTION

This invention relates to coating systems suitable for protecting components exposed to high-temperature environments, such as the hostile thermal environment of a gas turbine engine. More particularly, this invention is directed to a graded thermal/environmental barrier coating system for a substrate formed of a material containing silicon.

BACKGROUND OF THE INVENTION

Higher operating temperatures for gas turbine engines are continuously sought in order to increase their efficiency. However, as operating temperatures increase, the high temperature durability of the components of the engine must correspondingly increase. Significant advances in high temperature capabilities have been achieved through formulation of iron, nickel and cobalt-base superalloys. While superalloys have found wide use for components throughout gas turbine engines, alternative materials have been proposed. Materials containing silicon, particularly those with silicon carbide (SiC) as a matrix material and/or as a reinforcing material, are currently being considered for high temperature applications, such as combustor and other hot section components of gas turbine engines.

In many applications, a protective coating is beneficial or required for the Si-containing material. For example, protection with a suitable thermal-insulating layer reduces the operating temperature and thermal gradient through the material. Additionally, such coatings should provide environmental protection by inhibiting the major mechanism for degradation of Si-containing materials in a corrosive water-containing environment, namely, the formation of volatile silicon monoxide (SiO) and silicon hydroxide ($Si(OH)_4$) products. Consequently, besides low thermal conductivity, a critical requirement of a thermal barrier coating system for a Si-containing material is stability in high temperature environments containing water vapors. Other important properties for the coating material include a coefficient of thermal expansion (CTE) compatible with the SiC-containing material, low permeability for oxidants, and chemical compatibility with the Si-containing material and silica scale formed from oxidation. As a result, suitable protective coatings for gas turbine engine components formed of Si-containing materials essentially have a dual function, serving as a thermal barrier and simultaneously providing environmental protection. A coating system having this dual function is termed a thermal/environmental barrier coating (T/EBC) system.

While various single-layer and multilayer T/EBC systems have been investigated, each has exhibited shortcomings relating to the above-noted requirements and properties for compatibility with a Si-containing material. For example, a coating of zirconia partially or fully stabilized with yttria (YSZ) as a thermal barrier layer exhibits excellent environmental resistance by itself, since it does not contain silica in its composition. However, YSZ does not adhere well to Si-containing materials (SiC or silicon) because of a CTE mismatch (about 10 ppm/° C. for YSZ as compared to about 4.9 ppm/° C. for SiC/SiC composites). Mullite ($3Al_2O_3 \cdot 2SiO_2$) has been proposed as a bond coat for YSZ on Si-containing substrate materials to compensate for this difference in CTE (mullite having a CTE of about 5.5 ppm/° C.). However, mullite exhibits significant silica activity and volatilization at high-temperatures if water (water vapor) is present.

Barium-strontium-aluminosilicate (BSAS) coatings suitable for Si-containing materials exposed to temperatures of up to 2400° F. (about 1315° C.) have also been proposed. BSAS provides excellent environmental protection and exhibits good thermal barrier properties due to its low thermal conductivity. However, for application temperatures approaching the melting temperature of BSAS (about 1700° C.), a BSAS protective coating would require a thermal-insulating top coat. BSAS has been proposed as a bond coat for YSZ in U.S. Pat. No. 5,985,970 to Spitsberg et al., assigned to the assignee of the present invention. The inclusion of a BSAS bond coat significantly increases the overall thickness of the T/EBC system. As application temperatures increase further beyond the thermal capability of a Si-containing material (limited by a melting temperature of about 2560° F. (about 1404° C.) for silicon), still thicker coatings capable of withstanding higher thermal gradients are required. However, as coating thickness increases, strain energy due to the CTE mismatch between individual coating layers and the substrate increases as well, which can cause debonding and spallation of the coating system.

Accordingly, there is a need for a thick T/EBC system for Si-containing materials that enables such materials to be used at application temperatures beyond the melting temperature of silicon.

BRIEF SUMMARY OF THE INVENTION

The present invention generally provides a coating system for Si-containing material, particularly those for articles exposed to high temperatures, including the hostile thermal environment of a gas turbine engine. Examples of such materials include those with a dispersion of silicon carbide, silicon carbide and/or silicon particles as a reinforcement material in a metallic or nonmetallic matrix, as well as those having a silicon carbide, silicon nitride and/or silicon-containing matrix, and particularly composite materials that employ silicon carbide, silicon nitride and/or silicon as both the reinforcement and matrix materials (e.g., SiC/SiC ceramic matrix composites (CMC)).

The invention is a compositionally-graded thermal/environmental barrier coating (T/EBC) system that exhibits improved mechanical integrity for high application temperatures that necessitate thick protective coatings, generally on the order of 250 μm or more. The T/EBC system includes an intermediate layer containing YSZ and mullite, alumina and/or an alkaline earth metal al minosilicate (preferably BSAS), which is preferably used in combination with a mullite-containing layer that overlies the surface of the Si-containing material, a layer of an alkaline earth metal aluminosilicate (again, preferably BSAS) between the mullite-containing layer and the intermediate layer, and a thermal-insulating top coat of YSZ overlying the intermediate layer. Particular embodiments are for the intermediate layer to have a substantially uniform composition of YSZ and either BSAS, mullite or alumina, or to contain sublayers within an innermost sublayer (contacting the BSAS layer) being BSAS, mullite or alumina and an outermost sublayer (contacting the YSZ top coat) being YSZ, or to be compositionally graded so that the concentrations of YSZ and BSAS, mullite or alumina continuously change through the thickness of the intermediate layer.

The mullite-containing layer has a CTE above that of a Si-containing substrate but less than that of the YSZ top coat, and therefore compensates for the difference in CTE between the Si-containing substrate and the other coating layers. In addition, the mullite-containing layer serves as a chemical barrier between BSAS layer and the Si-containing substrate to prevent interaction of BSAS with the silicon oxidation product ($SiO_2$) at high temperatures. The BSAS layer provides environmental protection to the silicon-containing substrate. The top coat of YSZ offers excellent thermal protection to the Si-containing substrate and the other underlying layers of the coating system. Finally, the YSZ-containing intermediate layer serves as a thermal barrier layer that also provides a CTE transition between the BSAS layer and the YSZ top coat as a result of its BSAS, mullite and/or alumina content, each of which has a CTE between that of YSZ and Si-containing materials.

According to this invention, a compositionally-graded T/EBC as described above is able to reliably provide both thermal and environmental protection to a Si-containing substrate at temperatures of up to 2000° C., particularly when present at total coating thicknesses of 250 µm or more, as a result of exhibiting improved mechanical integrity as compared to prior art coating systems for Si-containing materials.

Other objects and advantages of this invention will be better appreciated from the following detailed description.

DETAILED DESCRIPTION OF THE INVENTION

Figure 1:
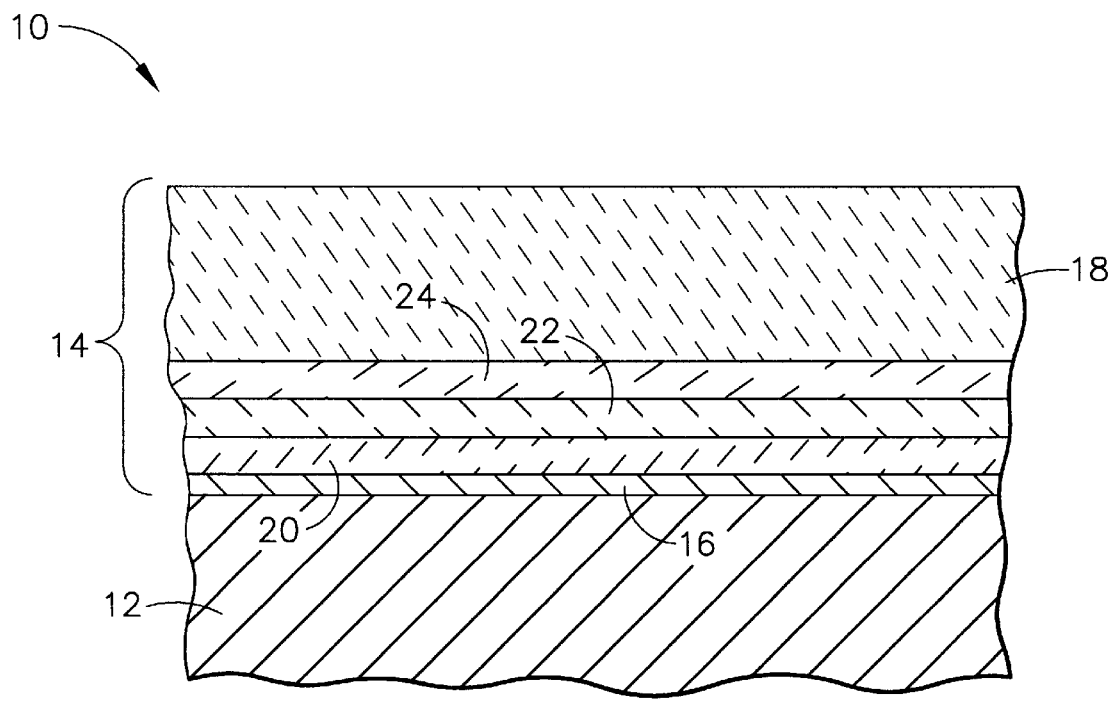
FIG. 1 is a cross-sectional view of a gas turbine engine component formed of a Si-containing material and having a thermal/environmental barrier coating system in accordance with this invention.

The present invention is generally applicable to components that operate within environments characterized by relatively high temperatures, and are therefore subjected to severe thermal cycling and stresses, oxidation, and corrosion. Notable examples of such components include combustor components, high pressure turbine vanes, and other hot section components of gas turbine engines. A surface region 12 of a hot section component 10 is represented in FIG. 1 for purposes of illustrating the invention. The component 10, or at least the surface region 12 of the component 10, is formed of a silicon-containing material such as a SiC/SiC CMC, though the invention is generally applicable to other materials containing silicon in any form.

As shown in FIG. 1, the surface region 12 of the component 10 is protected by a multilayer T/EBC system 14 that includes a thermal-insulating top coat 18. The coating system 14 provides environmental protection to the underlying surface region 12 as well as reduces the operating temperature of the component 10 and interior layers 20, 22 and 24 of the coating system 14, thereby enabling the component 10 to survive within higher temperature environments than otherwise possible. The preferred material for the top coat 18 is YSZ, more preferably about 7 weight percent yttria, though it is foreseeable that other ceramic materials could be used. A suitable thickness range for the YSZ top coat 18 is about 12.5 to about 1250 µm (about 0.0005 to about 0.050 inch), with a preferred range of about 125 to about 750 µm (about 0.005 to about 0.030 inch), depending on the particular application.

The major mechanism for degradation of silicon carbide (as well as silicon and other silicon compounds) in a corrosive environment is the formation of volatile silicon monoxide (SiO) and silicon hydroxide ($Si(OH)_4$) products. The diffusivity of oxidants in the YSZ top coat 18 is generally very high. Therefore, in order to protect the Sil-containing surface region 12, the coating system 14 must include additional layers beneath the top coat 18 that, individually or in combination, exhibit low diffusivity to oxidants, e.g., oxygen and water vapor, to inhibit oxidation of the silicon carbide within the surface region 12, while also being sufficiently chemically and physically compatible with the surface region 12 to remain adherent to the region 12 under severe thermal conditions.

In a preferred embodiment of this invention, the combination of interior layers 20, 22 and 24 shown in FIG. 1 provides a graded composition that fulfills the requirements noted above. A preferred inner layer 20 of the coating system 14 contains mullite, over which is deposited a layer 22 of an alkaline earth metal aluminosilicate, preferably BSAS. According to the invention, separating the BSAS layer 22 and the top coat 18 is a YSZ-containing layer 24 that also contains mullite, alumina and/or an alkaline earth metal aluminosilicate (again, preferably BSAS). The YSZ-containing layer 24 of the invention promotes the ability of the T/EBC system 14 to thermally and environmentally protect the Si-containing surface region 12 over numerous thermal cycles and at elevated temperatures.

The mullite-containing layer 20 serves to adhere the BSAS and YSZ-containing layers 22 and 24 to the Si-containing surface region 12, while also preventing interactions between the BSAS layer 22 and the Si-containing surface region 12 at high temperatures. Mullite is suitable as the material for the innermost layer of the coating system 14 because of its chemical stability with Si-containing materials at high temperatures. The layer 20 may also contain BSAS (or even entirely BSAS), for less demanding applications, e.g., temperatures below about 1300° C. The addition of BSAS to the layer 20 is also relatively compatible with the Si-containing surface region 12 in terms of having a CTE of about 5.27 ppm/° C., as compared to a CTE of about 4.9 ppm/° C. for SiC/SiC CMC. A suitable thickness range for the mullite-containing layer 20 is about 25 to about 250 µm (about 0.001 to about 0.010 inch), depending on the particular application.

The BSAS layer 22 overlying the mullite-containing layer 20 provides excellent environmental protection and exhibits good thermal barrier properties due to its low thermal conductivity. Particularly, BSAS is able to serve as an environmental barrier to the underlying mullite-containing layer 20, which would exhibit significant silica activity and volatilization if exposed to water vapor at high temperatures. As a result, the BSAS layer 22 is able to inhibit the growth of an interfacial silica layer at the surface region 12 when the component 10 is exposed to the oxidizing environment of a gas turbine engine. In addition, BSAS is physically compliant with a SiC-containing substrate, such as the surface region 12, and is relatively compatible with the mullite-containing layer 20 and the Si-containing surface region 12 in terms of CTE. A suitable thickness range for the BSAS layer 22 is about 125 to about 500 µm (about 0.005 to about 0.020 inch), depending on the particular application.

Three embodiments are contemplated for the YSZ-containing layer 24 of this invention. In a first embodiment, the YSZ-containing layer 24 is a substantially homogeneous mixture of YSZ and BSAS, mullite and/or alumina, with YSZ constituting up to 90 weight percent of the layer 24.

Alternatively, the layer 24 can be made up of discrete sublayers, each with a different composition. In this embodiment, the composition of the sublayer contacting the BSAS layer 22 is preferably essentially BSAS, mullite and/or alumina, while the outermost sublayer contacting the YSZ top coat 18 is preferably essentially YSZ. One or more intermediate sublayers are preferably present and have compositions that are intermediate those of the inner and outer sublayers.

According to the third embodiment, the YSZ-containing layer 24 has a continuously changing composition, from essentially all YSZ adjacent the YSZ top coat 18 to essentially all BSAS, mullite and/or alumina adjacent the BSAS layer 22. In this embodiment, the layer 24 has a decreasing concentration of BSAS, mullite and/or alumina and an increasing concentration of YSZ in a direction away from the BSAS layer 22. In combination, the higher concentration of BSAS, mullite and/or alumina adjacent the BSAS layer 22 and the higher concentration of YSZ adjacent the YSZ top coat 18 serve to provide a gradually increasing CTE, with a minimum CTE adjacent the BSAS layer 22 and a maximum CTE adjacent the YSZ top coat 18.

A suitable thickness for the YSZ-containing layer 24 is up to about 500 µm (up to about 0.020 inch), depending on the particular application and the thickness of the other layers 20, 22 and 24. High application temperatures, e.g., up to 2000° C., necessitate thick protective coating systems, generally on the order of 250 µm or more. It is with such coating systems that the benefits of the YSZ-containing layer 24 become more necessary to improve the mechanical integrity of the coating system. The YSZ constituent of this layer 24 serves to increase its overall CTE to something closer to the YSZ top coat 18.

Advantages of using mullite, alumina or a mixture of these with YSZ in the layer 24 include their higher temperature capability as compared to BSAS. Because BSAS exhibits low silica activity and low diffusivity to oxidants, a YSZ-containing layer 24 that also contains IBSAS is also able to serve as an environmental barrier to the underlying surface region 12. Simultaneously, additions of BSAS to the layer 24 render this layer 24 more compatible with the underlying BSAS layer 22 in terms of CTE. Advantageously, BSAS exhibits sufficient environmental resistance such that, if the YSZ top coat 18 were to spall, the underlying BSAS+YSZ-containing layer 24 could continue to provide a level of environmental protection to the mullite layer 20 and Si-containing surface region 12.

Shown in FIG. 1 is an optional silicon layer 16 between the mullite-containing layer 20 and the surface region 12. In accordance with U.S. patent application Ser. No. 09/299, 418, the inclusion of the silicon layer 16 is useful to improve oxidation resistance of the surface region 12 and enhance bonding between the mullite layer 20 and the surface region 12 if the surface region 12 contains SiC or silicon nitride ($Si_3N_4$). A suitable thickness for the silicon layer 16 is about 12.5 to about 250 micrometers.

As with prior art bond coats and environmental coatings, the layers 20, 22 and 24 can be individually deposited by air and vacuum plasma spraying (APS and VPS, respectively), though it is foreseeable that deposition, could be performed by other known techniques, such as chemical vapor deposition (CVD) and high velocity oxy-fuel (HVOF). The top coat 18 can also be deposited by known techniques, including plasma spraying and physical vapor deposition (PVD) techniques. Thereafter, a heat treatment may be performed after deposition of the individual layers 16, 20, 22 and 24 and/or top coat 18 to relieve residual stresses created during cooling from elevated deposition temperatures.

While our invention has been described in terms of a preferred embodiment, it is apparent that other forms could be adopted by one skilled in the art. Accordingly, the scope of our invention is to be limited only by the following claims.

What is claimed is:

1. A article comprising:
    a substrate formed of a silicon-containing material;
    at least one inner layer overlying the substrate;
    an intermediate layer overlying the at least one inner layer, the intermediate layer consisting essentially of yttria-stabilized zirconia and at least one material selected from the group consisting of mullite, alumina and alkaline earth metal aluminosilicates, the intermediate layer having a coefficient of thermal expansion between that of yttria-stabilized zirconia and that of the inner layer; and
    a top coat containing yttria-stabilized zirconia and overlying the intermediate layer.

2. An article as recited in claim 1, wherein the substrate is formed of a material selected from the group consisting of metal matrix composites reinforced with at least one of silicon carbide, silicon nitride and silicon, composites having a matrix of at least one of silicon carbide, silicon nitride and silicon, and composites have at least one of a silicon carbide, silicon nitride and silicon matrix reinforced with at least one of silicon carbide, silicon nitride and silicon.

3. An article as recited in claim 1, wherein the at least one inner layer is a single layer containing mullite.

4. An article as recited in claim 1, wherein the at least one inner layer comprises a first inner layer containing mullite and a second inner layer of an alkaline earth metal aluminosilicate between the first inner layer and the intermediate layer.

5. An article as recited in claim 1, wherein the at least one inner layer consists essentially of barium strontium aluminosilicate.

6. An article as recited in claim 1, wherein the top coat consists of yttria-stabilized zirconia.

7. An article as recited in claim 1, wherein the intermediate layer has a substantially uniform composition of yttria-stabilized zirconia and the at least one material.

8. An article as recited in claim 1, wherein the intermediate layer comprises sublayers, a first sublayer contacting the inner layer and having a substantially uniform composition of at least one material selected from the group consisting of barium strontium aluminosilicate, mullite and alumina, a second sublayer contacting the topcoat and having a substantially uniform composition of yttria-stabilized zirconia.

9. An article as recited in claim 1, wherein the intermediate layer is compositionally graded, the intermediate layer consisting essentially of at least one of barium strontium aluminosilicate, mullite and alumina at an interface of the intermediate layer with the inner layer, and consisting essentially of yttria-stabilized zirconia at an interface of the intermediate layer with the topcoat, the intermediate layer having a decreasing concentration of at least one of barium strontium aluminosilicate, mullite and alumina and an increasing concentration of yttria-stabilized zirconia in a direction away from the inner layer.

10. An article comprising:
    a substrate formed of a silicon-containing material;
    a mullite-containing first layer on the substrate;
    a second layer on the first layer, the second layer consisting essentially of barium strontium aluminosilicate;

a third layer on the second layer, the third layer consisting essentially of yttria-stabilized zirconia and at least one material selected from the group consisting of barium strontium aluminosilicate, mullite and alumina; and a top coat of yttria-stabilized zirconia on the third layer.

11. An article as recited in claim 10, wherein the substrate is formed of a material selected from the group consisting of metal matrix composites reinforced with at least one of silicon carbide, silicon nitride and silicon, composites having a matrix of at least one of silicon carbide, silicon nitride and silicon, and composites with at least one of a silicon carbide, silicon nitride and silicon matrix reinforced with at least one of silicon carbide, silicon nitride and silicon.

12. An article as recited in claim 10, wherein the first layer is mullite or a mixture of mullite and barium strontium aluminosilicate.

13. An article as recited in claim 12, wherein the first layer has a thickness of about 25 to about 250 micrometers.

14. An article as recited in claim 10, wherein the first layer consists essentially of mullite.

15. An article as recited in claim 10, wherein the first layer consists essentially of a mixture of mullite and barium strontium aluminosilicate.

16. An article as recited in claim 10, wherein the second layer consists of barium strontium aluminosilicate.

17. An article as recited in claim 16, wherein the second layer has a thickness of about 125 to about 500 micrometers.

18. An article as recited in claim 10, wherein the third layer has a substantially uniform composition of yttria-stabilized zirconia and the at least one material.

19. An article as recited in claim 10, wherein the third layer comprises sublayers, a first sublayer contacting the second layer and having a substantially uniform composition of at least one material selected from the group consisting of barium strontium aluminosilicate, mullite and alumina, a second sublayer contacting the topcoat and having a substantially uniform composition of yttria-stabilized zirconia.

20. An article as recited in claim 10, wherein the third layer is compositionally graded, the third layer consisting essentially of at least one of barium strontium aluminosilicate, mullite and alumina at an interface of the third layer with the second layer, and consisting essentially of yttria-stabilized zirconia at an interface of the third layer with the topcoat, the third layer having a decreasing concentration of at least one of barium strontium aluminosilicate, mullite and alumina and an increasing concentration of yttria-stabilized zirconia in a direction away from the second layer.

21. An article as recited in claim 10, wherein the third layer has a thickness of up to about 500 micrometers.

22. An article as recited in claim 10, wherein the top coat has a thickness of about 12.5 to about 1250 micrometers.

23. An article as recited in claim 10, further comprising a layer of silicon between the first layer and the substrate.

24. An article as recited in claim 10, wherein the article is a component of a gas turbine engine.

25. A gas turbine engine component formed of a silicon-containing material and having a thermal/environmental barrier coating system on a surface thereof, the thermal/environmental barrier coating system comprising:

a first layer on the surface and consisting essentially of mullite or a mixture of mullite and barium strontium aluminosilicate, the first layer having a thickness of about 75 to about 250 micrometers;

a second layer on the first layer, the second layer consisting essentially of barium strontium aluminosilicate, the second layer having a thickness of about 125 to about 500 micrometers;

a third layer on the second layer, the third layer consisting essentially of yttria-stabilized zirconia and one material selected from the group consisting of barium strontium aluminosilicate, mullite and alumina, the third layer having a thickness of up to about 500 micrometers; and a top coat of yttria-stabilized zirconia on the third layer, the top coat having a thickness of about 12.5 to about 1250 micrometers.

26. A gas turbine engine component as recited in claim 25, wherein the component is formed of a material selected from the group consisting of metal matrix composites reinforced with at least one of silicon carbide, silicon nitride and silicon, composites having a matrix of at least one of silicon carbide, silicon nitride and silicon, and composites with at least one of a silicon carbide, silicon nitride and silicon matrix reinforced with at least one of silicon carbide, silicon nitride and silicon.

27. A gas turbine engine component as recited in claim 25, wherein the first layer consists essentially of mullite.

28. A gas turbine engine component as recited in claim 25, wherein the first layer consists essentially of a mixture of mullite and barium strontium aluminosilicate.

29. A gas turbine engine component as recited in claim 25, wherein the third layer has a substantially uniform composition of a mixture of yttria-stabilized zirconia and the one material.

30. A gas turbine engine component as recited in claim 25, wherein the third layer comprises sublayers, a first sublayer contacting the second layer and having a substantially uniform composition of barium strontium aluminosilicate, mullite or alumina, a second sublayer contacting the topcoat and having a substantially uniform composition of yttria-stabilized zirconia, and at least one intermediate sublayer between the first and second sublayers, the intermediate sublayer having a composition that is intermediate the compositions of the first and second sublayers.

31. A gas turbine engine component as recited in claim 25, wherein the third layer is compositionally graded, the third layer consisting essentially of at least one of barium strontium aluminosilicate, mullite and alumina at an interface of the third layer with the second layer, and consisting essentially of yttria-stabilized zirconia at an interface of the third layer with the topcoat, the third layer having a decreasing concentration of at least one of barium strontium aluminosilicate, mullite and alumina and an increasing concentration of yttria-stabilized zirconia in a direction away from the second layer.

32. A gas turbine engine component as recited in claim 25, further comprising a layer of silicon between the first layer and the substrate.

* * * * *

UNITED STATES PATENT AND TRADEMARK OFFICE
CERTIFICATE OF CORRECTION

PATENT NO. : 6,444,335 B1  
DATED : September 3, 2002  
INVENTOR(S) : Hongyu Wang, Irene Spitsberg and Bangalore Nagaraj It is certified that error appears in the above-identified patent and that said Letters Patent is hereby corrected as shown below:

Column 1,
Line 4, please insert the following text:
-- This invention was made with Government support under contract No. F33615-98-C-2893, awarded by the Air Force. The Government has certain rights in the invention. --

Signed and Sealed this

Eighteenth Day of February, 2003

JAMES E. ROGAN
*Director of the United States Patent and Trademark Office*